Sept. 20, 1971 J. D. VREDEVOOGD 3,605,351
TELESCOPING AND LATERALLY-MOVABLE MOBILE HOME SYSTEM
Filed May 22, 1969 13 Sheets-Sheet 5

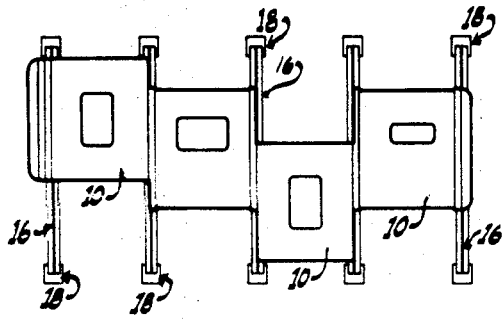
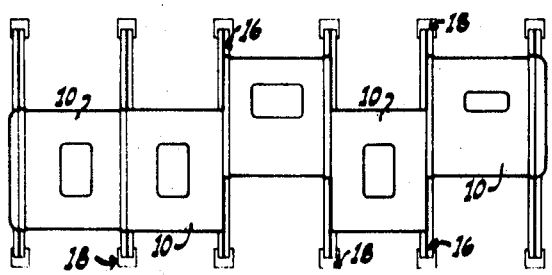
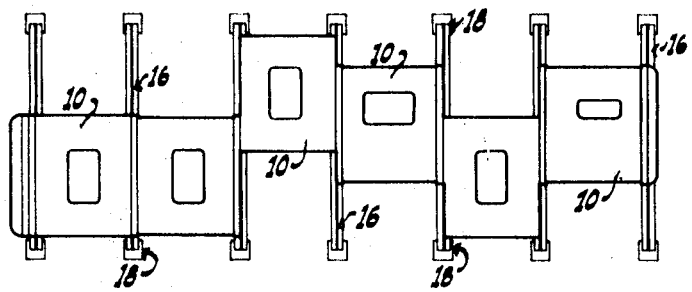
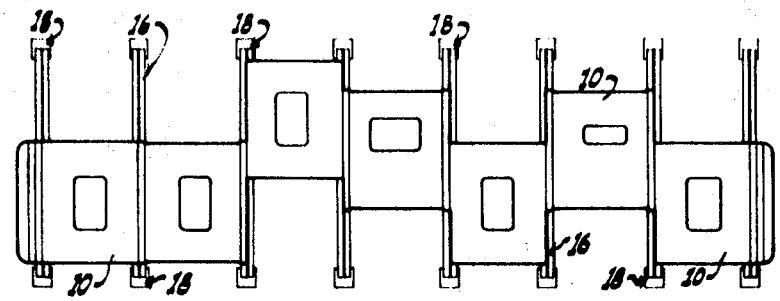
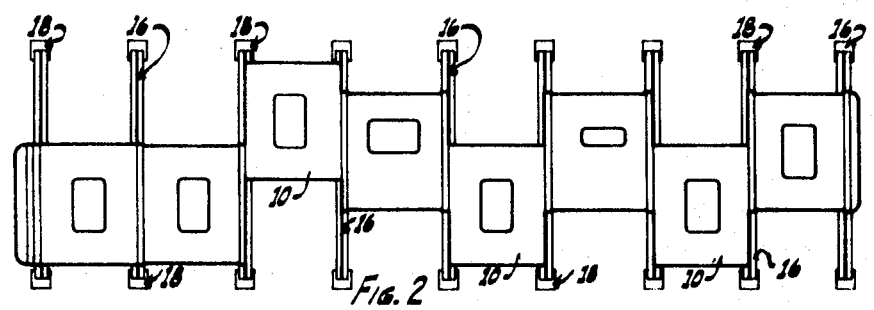
FIG. 2

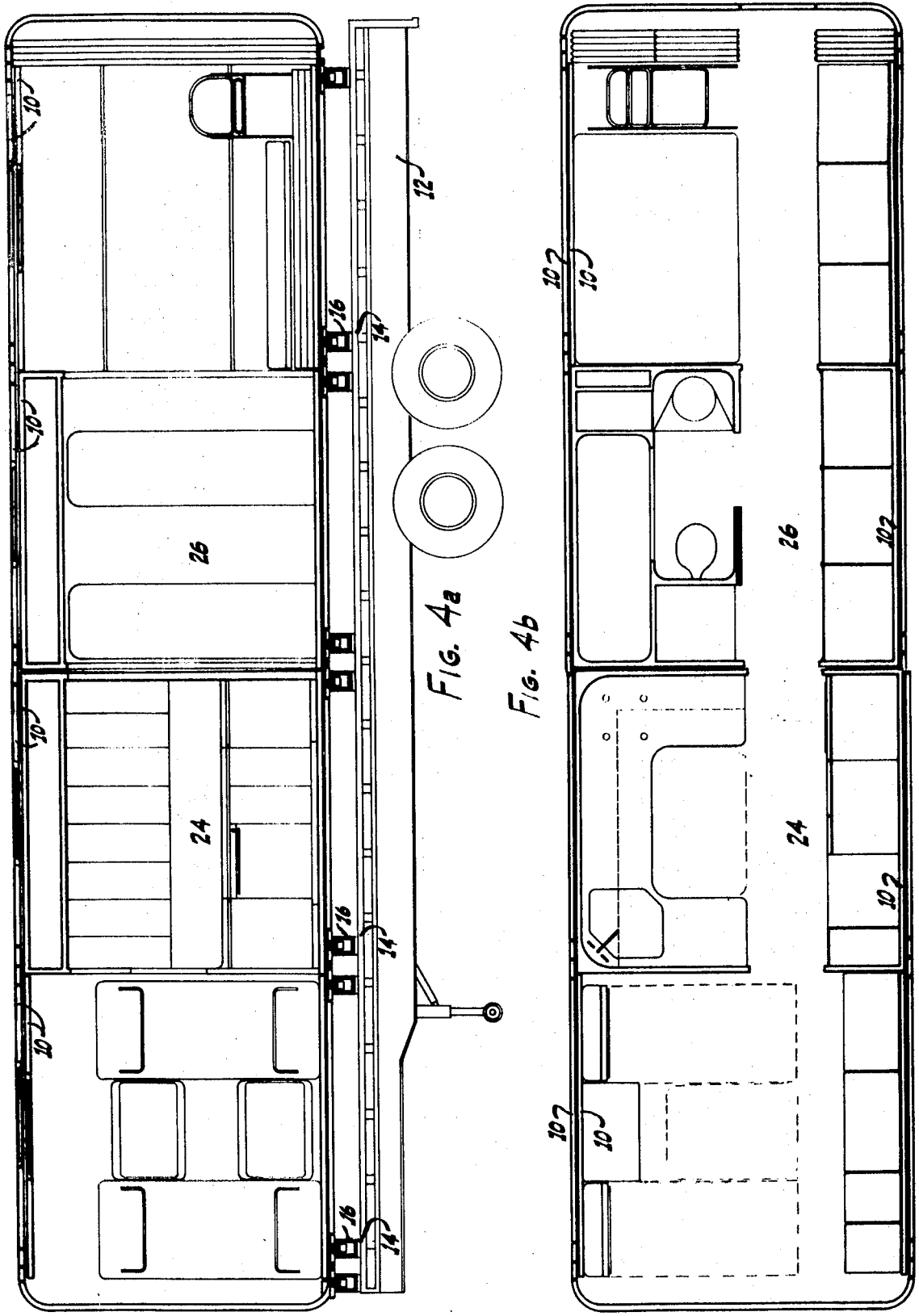

INVENTOR.
JON D. VREDEVOOGD

Sept. 20, 1971   J. D. VREDEVOOGD   3,605,351
TELESCOPING AND LATERALLY-MOVABLE MOBILE HOME SYSTEM
Filed May 22, 1969   13 Sheets-Sheet 8

INVENTOR.
JON D. VREDEVOOGD

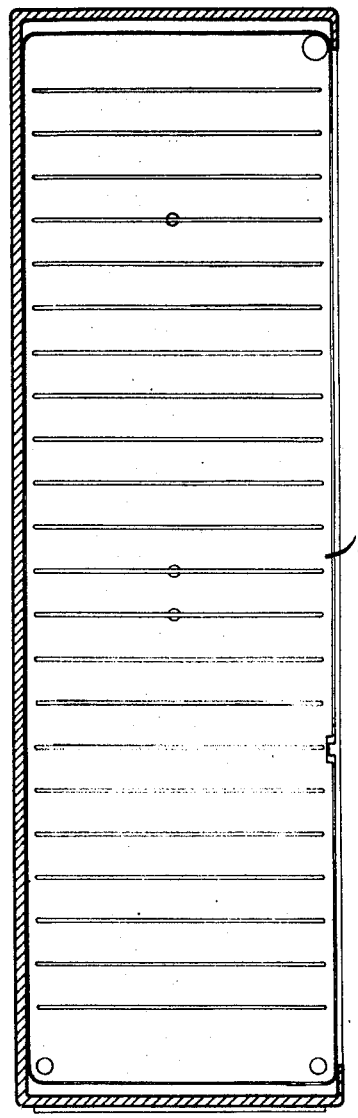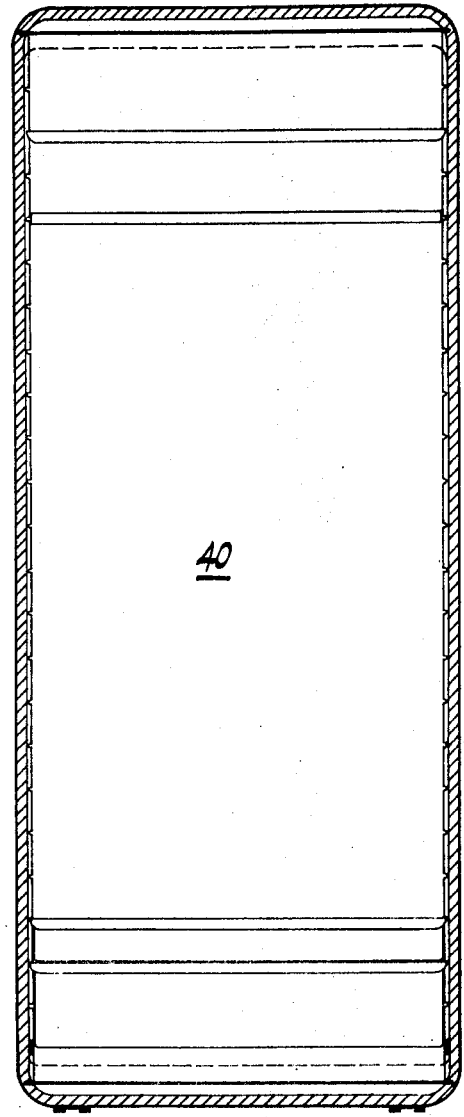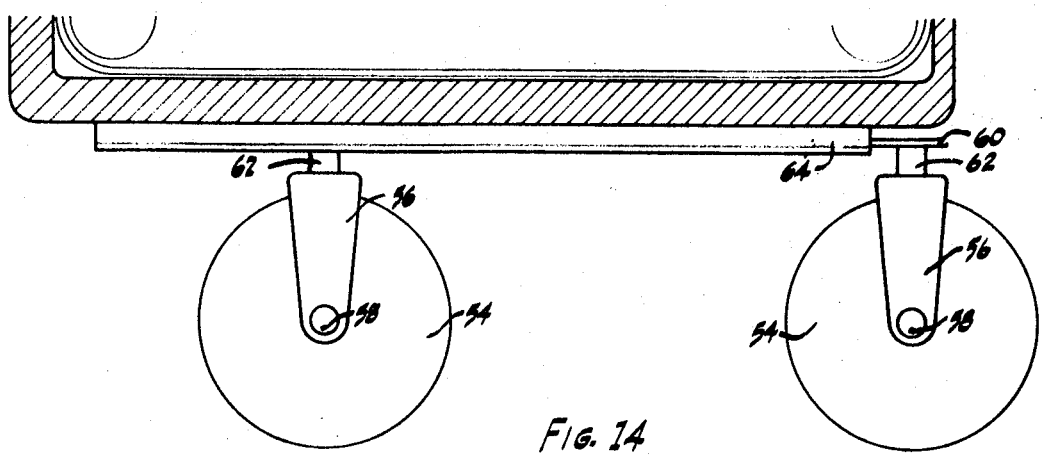

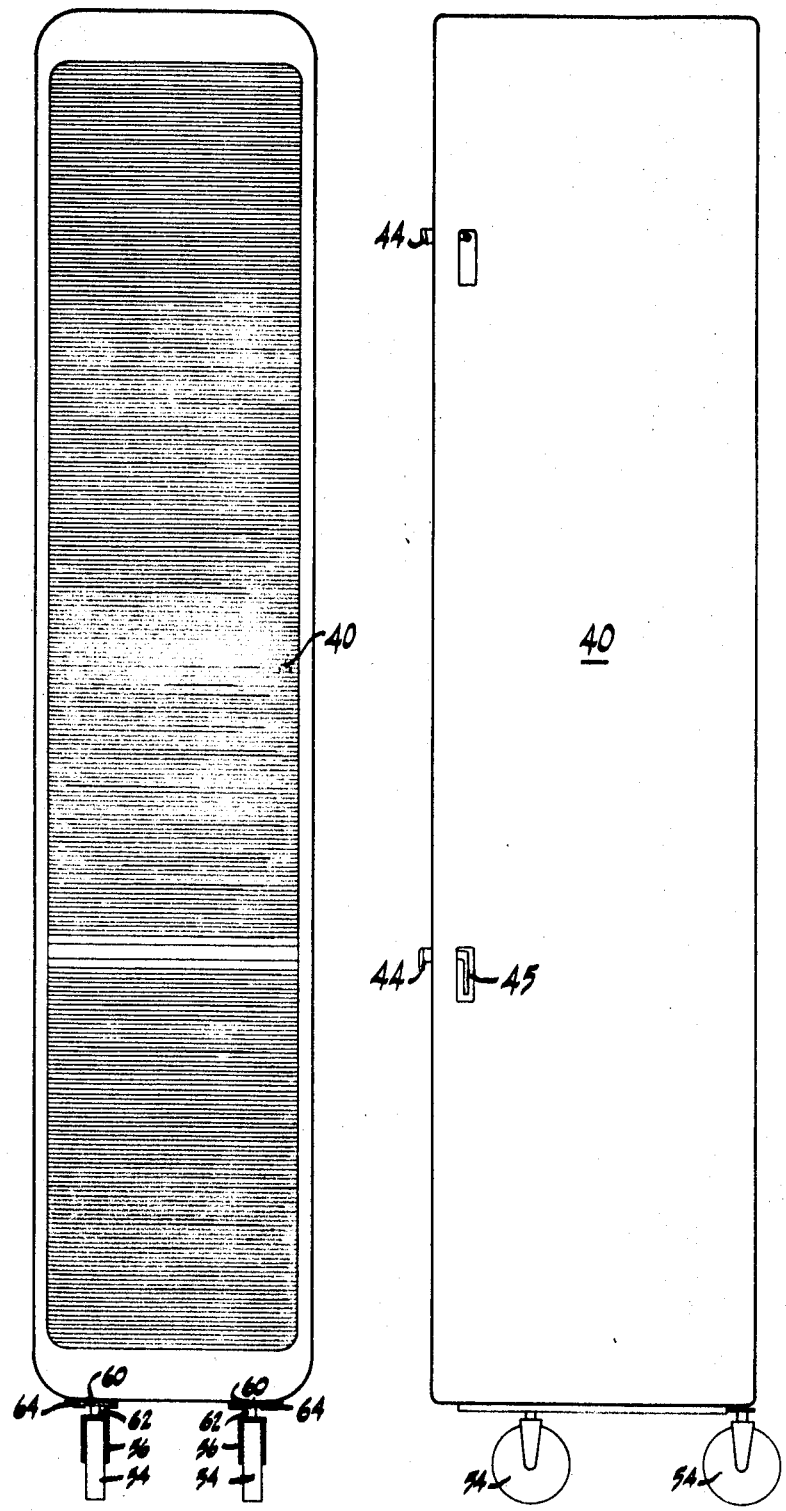

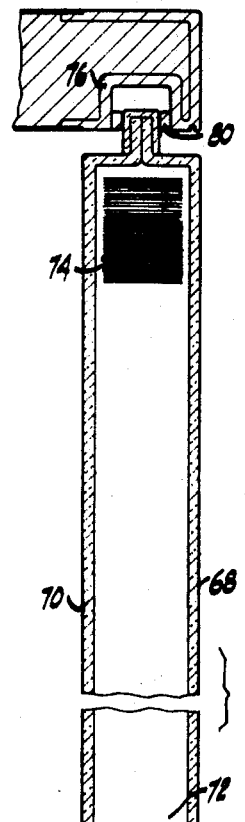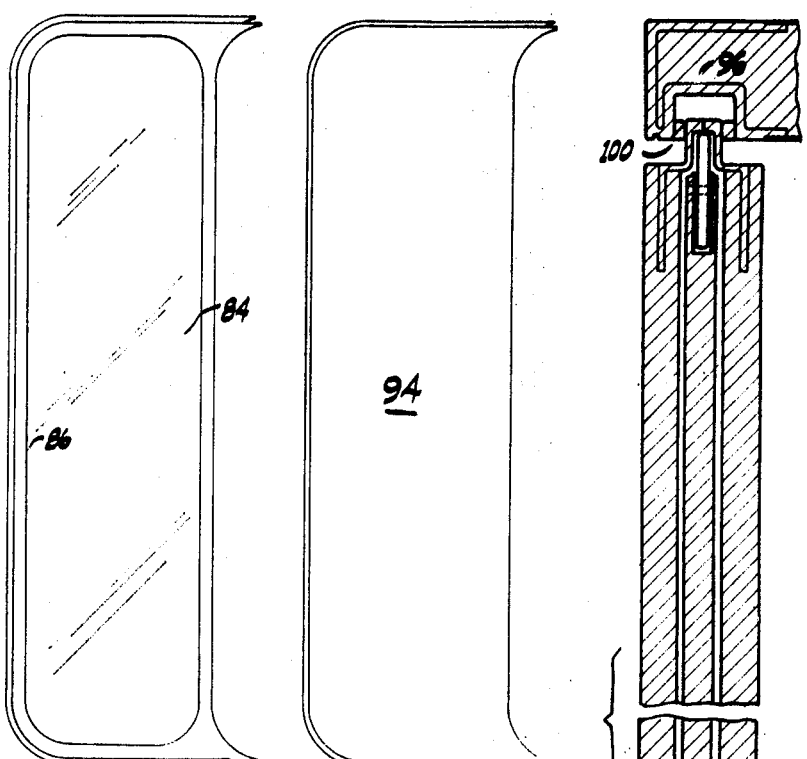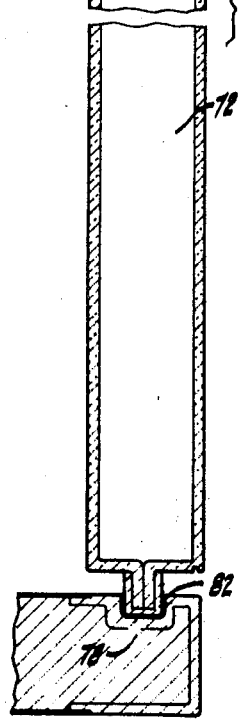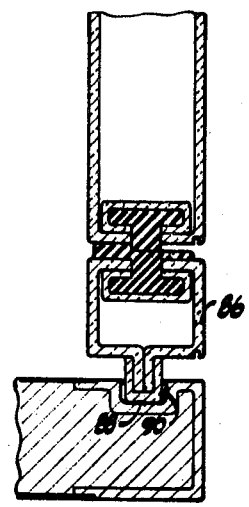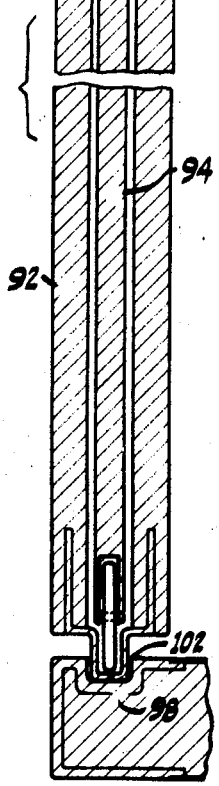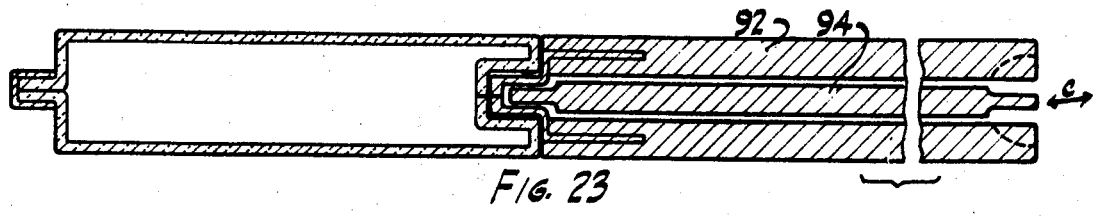

United States Patent Office 3,605,351
Patented Sept. 20, 1971

3,605,351
TELESCOPING AND LATERALLY-MOVABLE
MOBILE HOME SYSTEM
Jon D. Vredevoogd, 314 Clinton Ave.,
Brooklyn, N.Y. 11205
Filed May 22, 1969, Ser. No. 826,927
Int. Cl. E04b 1/343
U.S. Cl. 52—29                                                                                  7 Claims

ABSTRACT OF THE DISCLOSURE

The present mobile home is transported on a standard flatbed truck and constitutes a number of segments which are adapted to be telescoping and have all components stored inside. Once the mobile home dwelling is on the selected site, the truck is pulled away and the entire mobile home is lowered to the desired level elevated from the ground by adjusting hydraulic cylinders inside vertical supports for the transverse girders. The transverse girders are provided so that the segments of the mobile house may be selectively moved laterally as well as being telescoped. This permits the staggering of the segments which opens up gaps along the exterior thereof into which window units may be inserted. Continuous tracks on the interior walls support the cabinets and other equipment in the mobile home, as well as functioning as electrical plug-in strips which serve all appliances and most lighting fixtures in the mobile home.

BACKGROUND OF THE INVENTION

The mobile home industry has grown in an extraordinary manner in recent years and now constitutes a one billion dollar a year industry. Mobile homes account for more than three-fourths of all new houses sold for under $12,500. Because of the critical housing shortage in the lower-priced houses, the solving of the housing problem today seems to be in the direction of more mobile housing. It is a fact that the average mobile home owner chooses a mobile home dwelling for reasons of low cost and mobility and that the search for more convenient and spacious mobile homes is the trend. As a matter of fact, many mobile home owners sell their present mobile home and buy larger and more luxurious mobile homes since current models are difficult to expand.

Although curently available mobile homes are satisfying the needs of a large group of individuals, they are not solving all today's problems. The mobile home units that are being sold are generally rectangular in configuration and are aesthetically unpleasing, especially from the exterior. A great number of mobile homes are too large to be easily transported by the owner's own vehicle or even by commercial transporter. On the other hand, the space provided by certain currently available homes is believed to be frequently inadequate inasmuch as many additions are made to these homes. Thus, the present day mobile homes do not have the flexibility that their owners require and this, of course, is a very serious drawback.

SUMMARY OF THE INVENTION

It is an object of the present invention to provide a mobile home which has a number of segments or units which can be added to or subtracted from as the needs of the owners demand. This mobile home is also packaged small enough for easy transporting by either commercial transporters or by the owners themselves. It is another object of the present invention to provide a plurality of mobile home systems in which each system is interconnected and positioned angularly relative to each other. For example, the systems may be T-shaped, I-shaped or cross-shaped, thereby providing further flexibility within the concept of the present invention.

It should also be apparent that each module may be considered as a living space itself or as part of a larger space. Accordingly, the owner of this arrangement can then purchase the number and type of sections he neeeds, as his needs change from time to time. Therefore, the home can also change. The initial purchase of a mobile home may be as few as four sections which might include the following basic sections: (1) kitchen, (2) bathroom, (3) a social area, and (4) a sleeping area. However, this type of mobile home can be added to as the requirements grow, or modules may be subtracted and sold as requirements change. The extended length, for example. which constitues about twice the size of the original mobile home, involves eight segments or sections. Thus, the arrangement is telescoping in which one section or unit fits inside another. This permits a 64-foot home to be only 34 feet in length as it travels, whether the owner has 4, 5, 6, 7 or 8 sections.

It is another object of the present invention to provide a mobile home which is not wasteful in space and is interesting in special arrangement. Therefore, in the mobile home of the present invention, the sections may be moved laterally to the right or to the left of the central axis as use of space requires. This enables one to enter one space on the left, next in the middle or on the right. In contradistinction thereto, in the present mobile home units, the corridor passing on the right or on the left axis of the unit forces an identical point of entrance to each space. Thus, the mobile unit constructed according to the teachings of the present invention is flexible and thereby, overcomes the average mobile home owner's tendency to change units quite often. Thus, by designing a system rather than a unit, the problem of flexibility all but disappears by the use of the present invention. Therefore, the owner of a mobile home is not only able to add and subtract from the space and the space is in relation to each other, but he is also able to change everything within that space, thereby resulting in total flexibility of a mobile home.

A further object of the present invention is to provide a bathroom core section and a kitchen core section which improves the present mobile home bathroom and kitchen arrangement and is provided with expanded facilities.

It is another object of the present invention to provide an interior sidewall construction of the mobile home units having two continuous tracks located one above the other. These tracks carry all the wall hung furniture and provide a continuous electrical strip. Thus, the furniture units are hung on the wall and can easily be detached and moved from one location to the other. In addition, these units are so designed that they can be stored in the interior of the mobile home system when the latter is telescoped from an eight-section to a four-section system.

Another object of the present invention is to provide a mobile home system that is completely self sustaining with the exception of water, the latter being occasionally required from an outside source. The home can be transported on a standard 35-foot flatbed trailer that can be rented and towed by the owner himself. In addition, due to its extraordinary flexibility, the mobile home unit can be adjusted for use in both urban and rural areas.

It is a further object of the present invention to install Plexiglas window panels containing sun control devices sealed within the space between the panels, the latter being clipped into open spaces that are uncovered as a result of the lateral shifting of modules of the mobile home system. It is also possible to put blank panels or doors in these open spaces if it is not desired to have additional window space.

The present invention further affords the owner the opportunity of architectural expression in the design of his home, with certain aesthetic limitations set forth by the system. Thus, flexibility in the design of a mobile home is obtained by the structure of the present invention and insures variety and continuity, resulting in a pleasing over-all appearance of the mobile community.

A further object of the present invention is to provide a structural frame for each segment or unit of the mobile home in a continuous tube comprising floors, walls and roof. The enclosing membrane may be a skin sandwich of urethane foam between two sheets of aluminum, or simply a membrane constituted as a sandwich using high strength plastic sheet instead of aluminum.

It is another object of the present invention to provide a mobile home unit in which the kitchen and bathroom core units have all their mechanical equipment in the roof area, and in otherwise unused space. Storage areas may have built-in plastic bags which can be inflated to hold everything in place when the mobile home is moving.

On a permanent site, the present mobile home system could expand to meet the needs of children and then contract as they leave home. It also should be noted that it is within the scope of the present invention to provide a mobile home system permanently mounted on its own chassis, similar to ordinary house trailers, as well as being completely separated from its wheeled transporting means.

BRIEF DESCRIPTION OF THE DRAWINGS

FIG. 2 is a diagrammatic view of the modular configuration of FIG. 1 in which the mobile home units are shown in a condition where they are not only expanded in a telescoping manner but are moved laterally.

FIG. 4a is a longitudinal sectional view of the present mobile home system being telescoped to four sections and loaded on a flatbed trailer truck.

FIG. 4b is a top plan view of FIG. 4a.

FIG. 12 is a cross-sectional view of FIG. 8.

FIG. 13 is another cross-sectional view of FIG. 8.

FIG. 14 is a view partly in section and partly in elevational view showing the details of the wheel and its mounting upon the furniture unit.

FIG. 15 is a front elevational view of a wall storage unit.

FIG. 16 is a side elevational view of the storage unit shown in FIG. 15.

FIG. 19 is a section taken through window panel showing the closed blind between Plexiglas portions of the front and rear sealed to form a dust-proof unit.

FIG. 20 is a partial elevational view of the swinging door for the present mobile home system.

FIG. 21 shows a sectional detail of a swinging door for the present mobile home system as seen in FIG. 20.

FIG. 22 is a partial elevational view of a sliding door for the present mobile home system.

FIG. 23 is a sectional detail of the sliding door and window panel arrangement for the present mobile home system.

FIG. 24 is a sectional view of the panel installation in a module of the present mobile home system.

DESCRIPTION OF THE PREFERRED EMBODIMENTS

Figure 1:
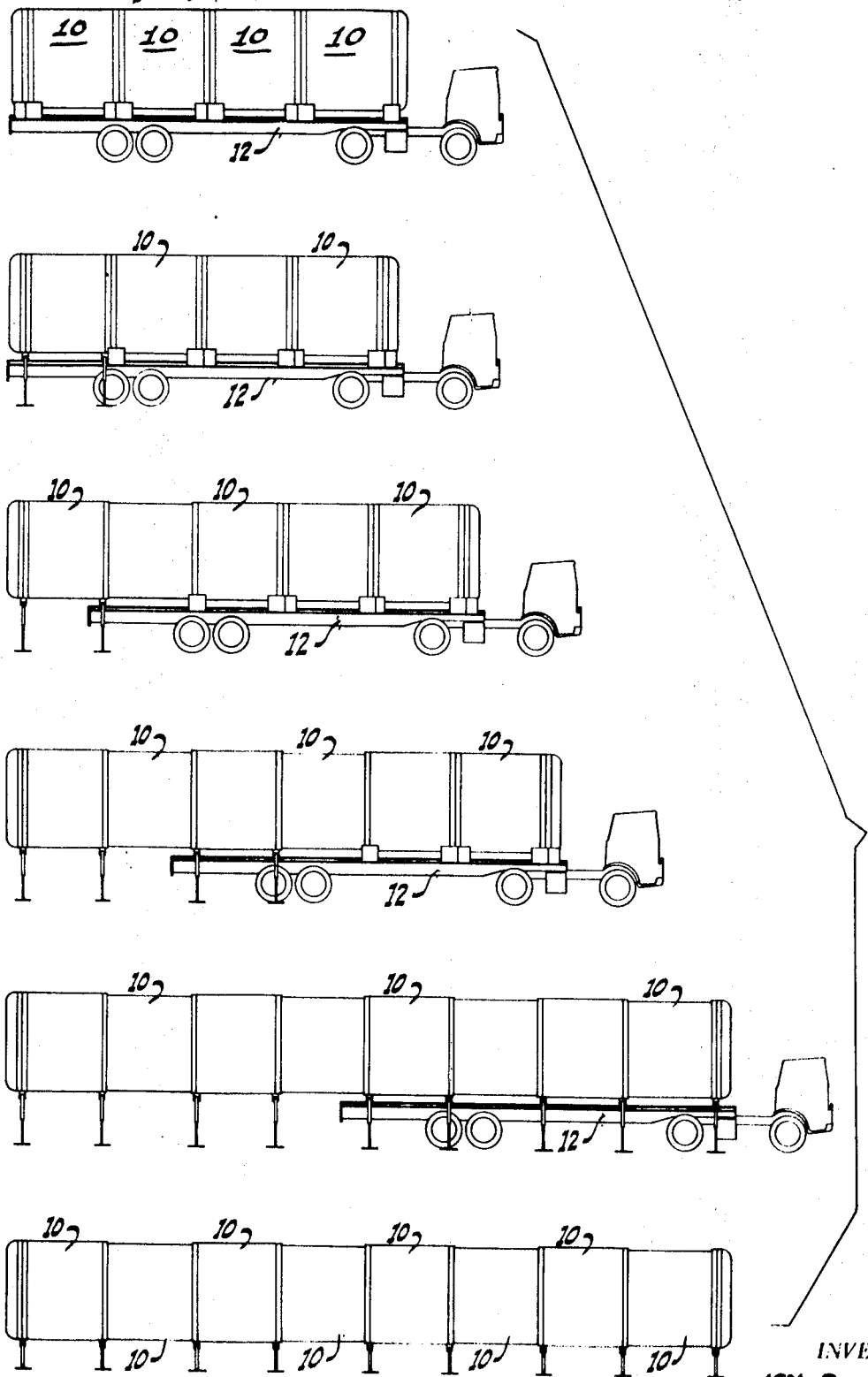
FIG. 1 is a diagrammatic side elevation view of the mobile home system constructed in accordance with the present invention, showing the units mounted on a flatbed trailer and dismounted therefrom, and also telescoped and expanded.
Figure 3A:
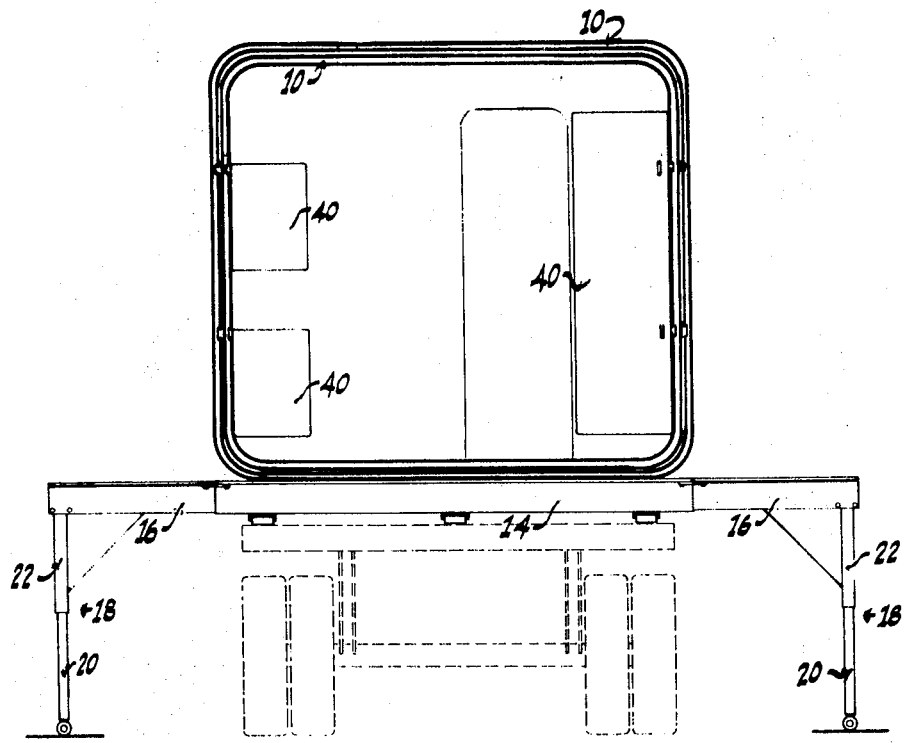
FIG. 3a is a sectional view of the mobile home as it is being removed from the truck and supported by adjustable vertical supports which are expanded laterally to permit movement of the modules in a lateral manner.
Figure 3B:
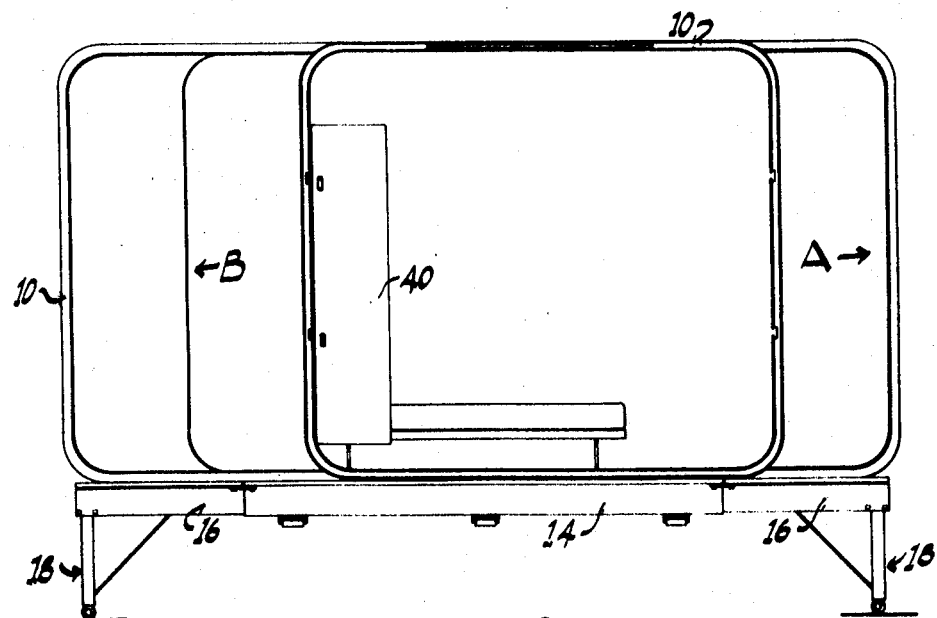
FIG. 3b shows the modules lowered and expanded laterally.

Referring more particularly to the drawings, FIG. 1 illustrates in a series of steps, the present mobile home system which is initially in a contracted mobile state and finally in its expanded condition wherein it is removed from its trailer transport and supported on vertical stanchions. The modules 10 of the present mobile home system may constitute two units or may be three, four or more units. Initially it is preferred to have four basic units, being a kitchen, bathroom, social and sleeping unit. However, as shown in FIG. 1 these four units may be expanded, for example to 8 units. As illustarted in FIG. 1, the four module telescoped system is loaded on to a standard flatbed trailer 12 and transported to the selected site. Upon the arrival at the site, support girders 16 are swung out from support base 14 of the mobile home system (FIG. 3a). Adjustable vertical stanchions referred to generally by the numeral 18 are swung down to a ground engaging position from a position within and co-axial with the support girders 16. The vertical stanchions 18 are provided with two telescoping sections 20 and 22 that permits vertical adjustability of the stanchions. FIG. 3b shows the mobile home system in its lowered position, and with certain modules 10 shifted laterally in the directions A and B on the extended support girders 16. FIG. 2 is a diagrammatic showing of a number of modules 10 which have been selectively expanded and shifted laterally to form various configurations. It should be apparent that a large number of variations of the mobile home system configurations may be achieved with the system of the present invention.

FIGS. 4a and 4b show a longitudinal and plan view respectively of the present mobile home system telescoped and contracted to a four unit arrangement for transportation purposes. The other four units of the system are telescoped into the interior of the four unit arrangement. FIG. 3a illustrates the interfitting or nesting of two of such units or modules 10. It will be noted that the furniture and accessories are all transported within the four unit mobile arrangement, and it should be noted that even in this contracted four unit condition the mobile home system is habitable. This is especially true of the kitchen core unit 24 and the bathroom core unit 26.

Figure 5A:
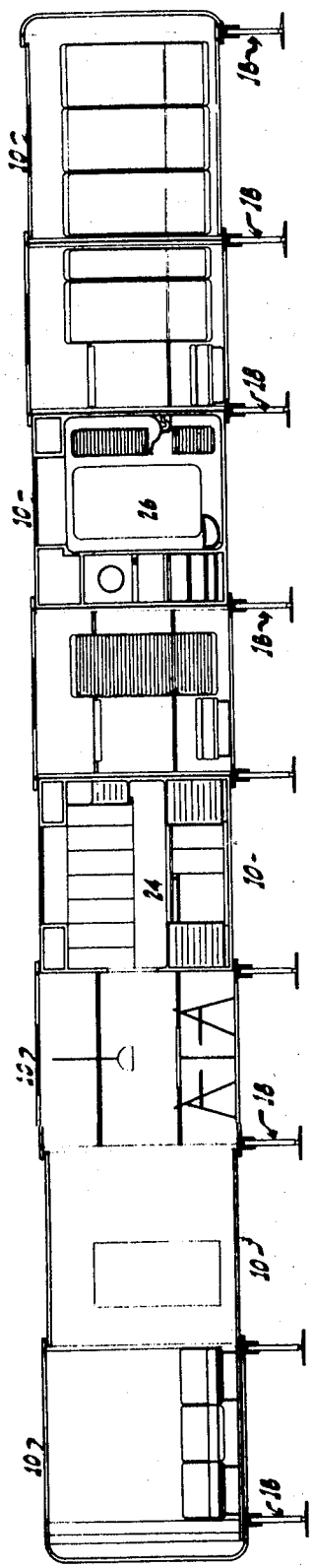
FIG. 5a is a longitudinal sectional view of the entire system constituting eight segments or sections expanded, and supported on vertical supports on a permanent site.
Figure 5B:
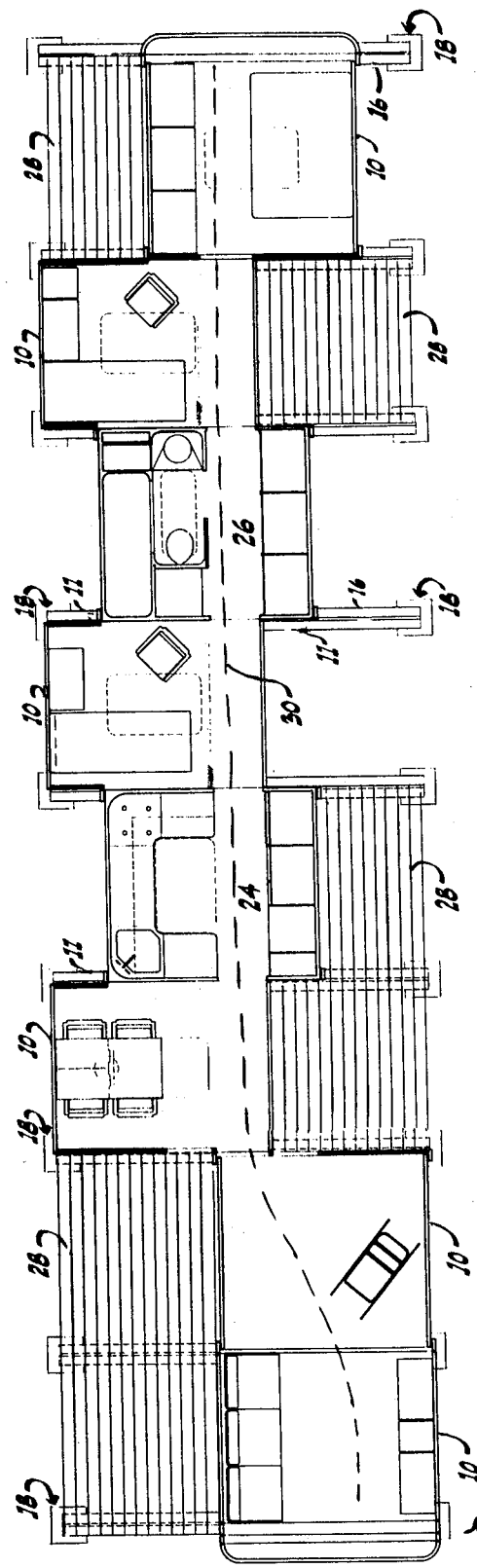
FIG. 5b is a plan view of the expanded system shown in FIG. 5a in which the segments are moved laterally to form a staggered plan.

FIGS. 5a and 5b illustrate a longitudinal and plan view respectively of an expanded mobile home system constructed in accordance with the teachings of the present invention in which eight sections are shown on a fixed site. The modules 10 have been selectively moved in a lateral direction to permit the wide use of porches or patios 28 adjacent to the modules and supported also on the support girders 16 and vertical stanchions 18. It will be noted from the dashed line 30 of FIG. 5b that although the modules 10 are selectively moved laterally there is a through passage extending continuously through all of the modules 10. However, the outer configuration of the mobile home is varied to conform to the owner's choice.

Figure 6:
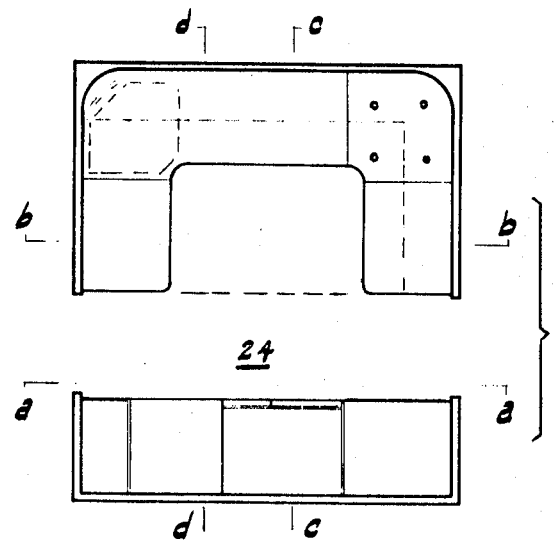
FIG. 6 is a plan view of the kitchen core unit in a segmented arrangement of the present mobile home system.
Figure 6A:
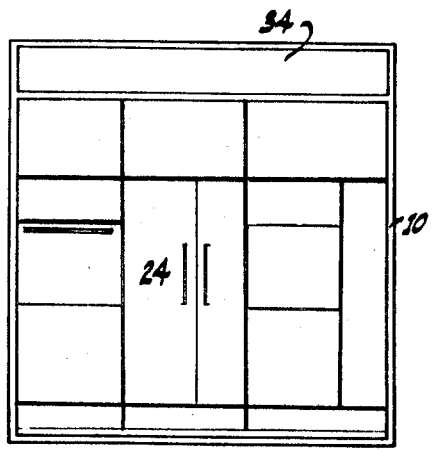
FIG. 6a is a section taken along the lines of 6a—6a of FIG. 6.
Figure 6B:
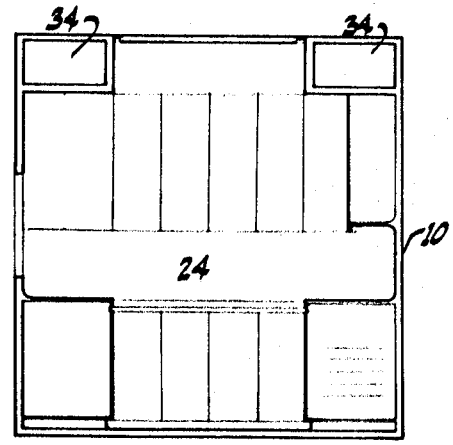
FIG. 6b is a section taken along the lines of 6b—6b in FIG. 6.
Figure 6C:
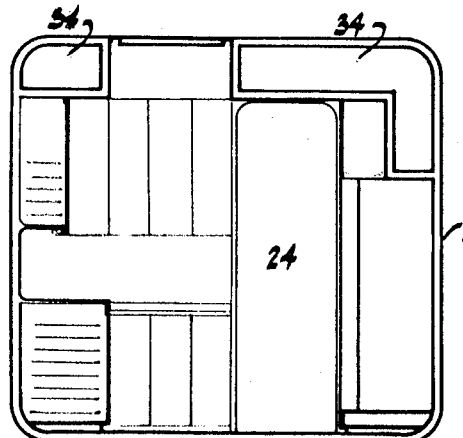
FIG. 6c is a section taken along the lines of 6c—6c in FIG. 6.
Figure 6D:
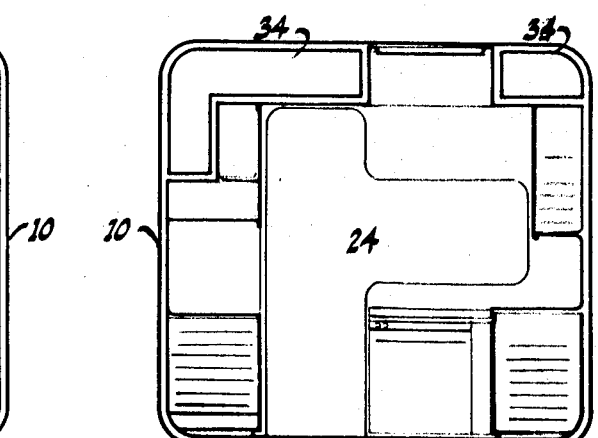
FIG. 6d is a section taken along the lines 6d—6d of FIG. 6.

FIG. 6 is a plan view of the kitchen core module 10 while FIGS. 6a, 6b, 6c and 6d are various sections taken through FIG. 6 to completely show the arrangement of the appliances and accessories which are designed for compact and practical use. It will be noted that the mechanical units for the kitchen are housed in space 34 in the upper parts of the kitchen module and remote from interfering with the normal functioning of the kitchen.

Figure 7:
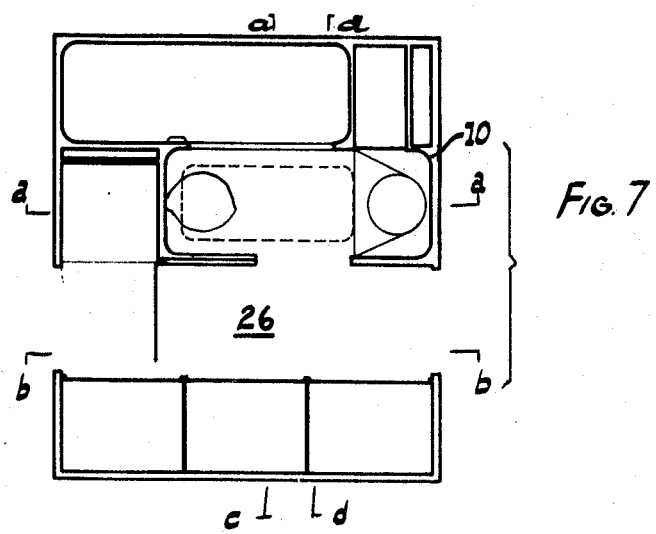
FIG. 7 is a plan view of the bathroom core unit of the present mobile home system.
Figure 7A:
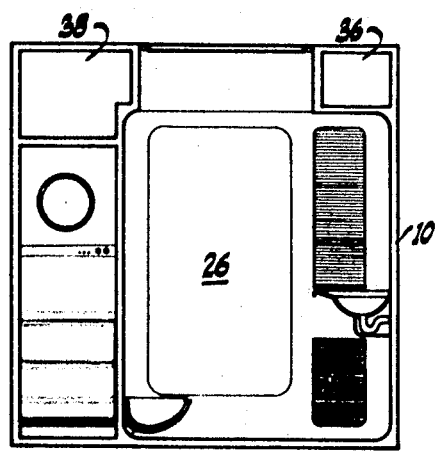
FIG. 7a is a section taken along the lines 7a—7a of FIG. 7.
Figure 7B:
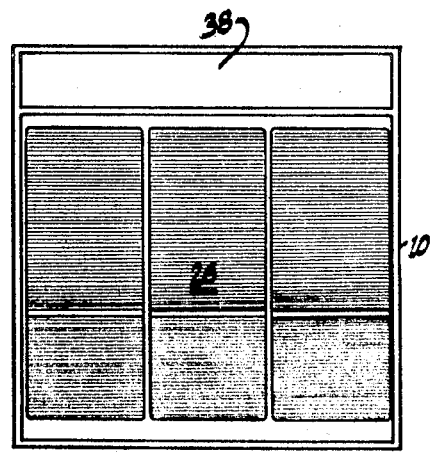
FIG. 7b is a section taken along the lines 7b—7b of FIG. 7.
Figure 7C:
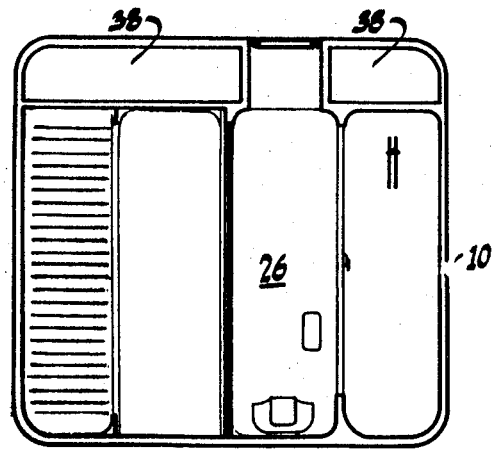
FIG. 7c is a section taken along the lines 7c—7c of FIG. 7.
Figure 7D:
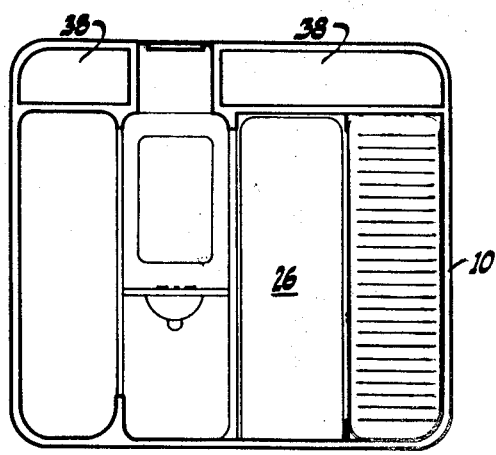
FIG. 7d is a section taken along the lines 7d—7d of FIG. 7.

FIG. 7 is a plan view of the bathroom core module 10 while FIGS. 7a, 7b, 7c and 7d are sections taken through FIG. 7 to also show one arrangement of the fixtures and accessories that are designed for compact and practical use. It is within the scope of the present invention to selectively change the location of the components of the kitchen and bathroom core units, thus achieving flexibility in their placement. Here again the ceiling area is provided with a space 38 for the enclosure of the mechanical equipment for the bathroom.

Figure 8:
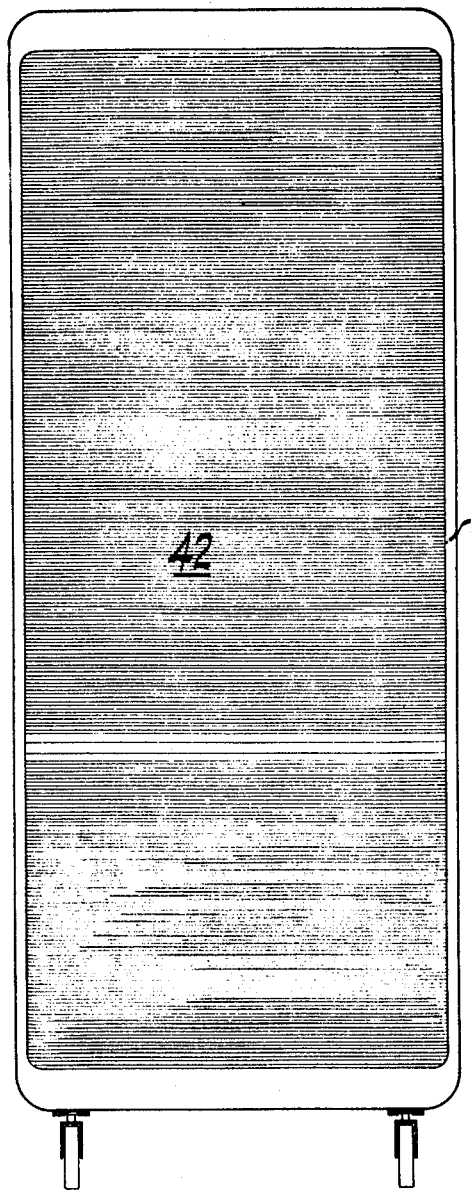
FIG. 8 is a front elevational view of a wall hung storage section or furniture unit for the mobile home system.
Figure 9:
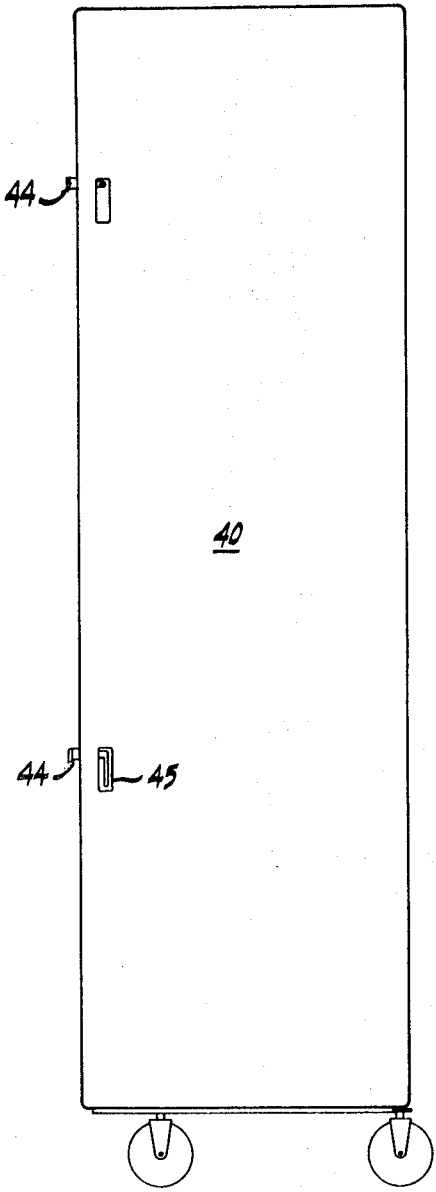
FIG. 9 is a side elevational view thereof.
Figure 10:
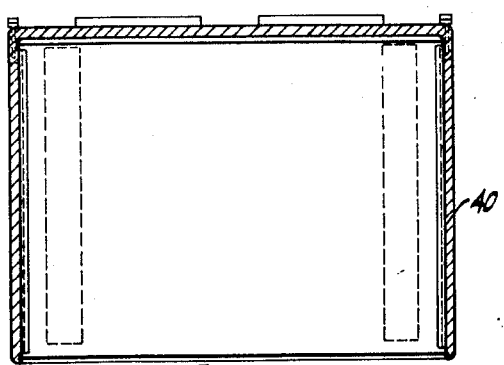
FIG. 10 is a cross-sectional view thereof.
Figure 11:
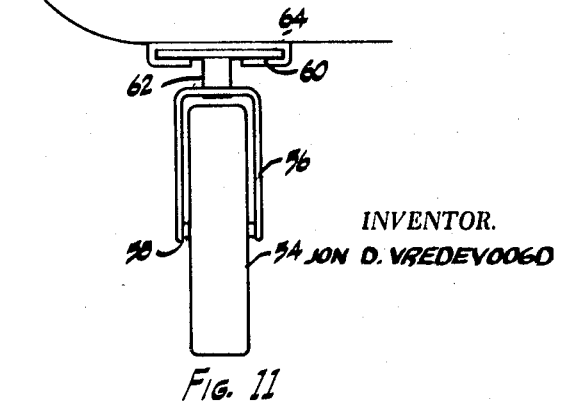
FIG. 11 is a front elevational view of the details of a wheel and its mounting as applied to the storage unit or furniture as set forth in FIG. 8.
Figures 17A, 18A:
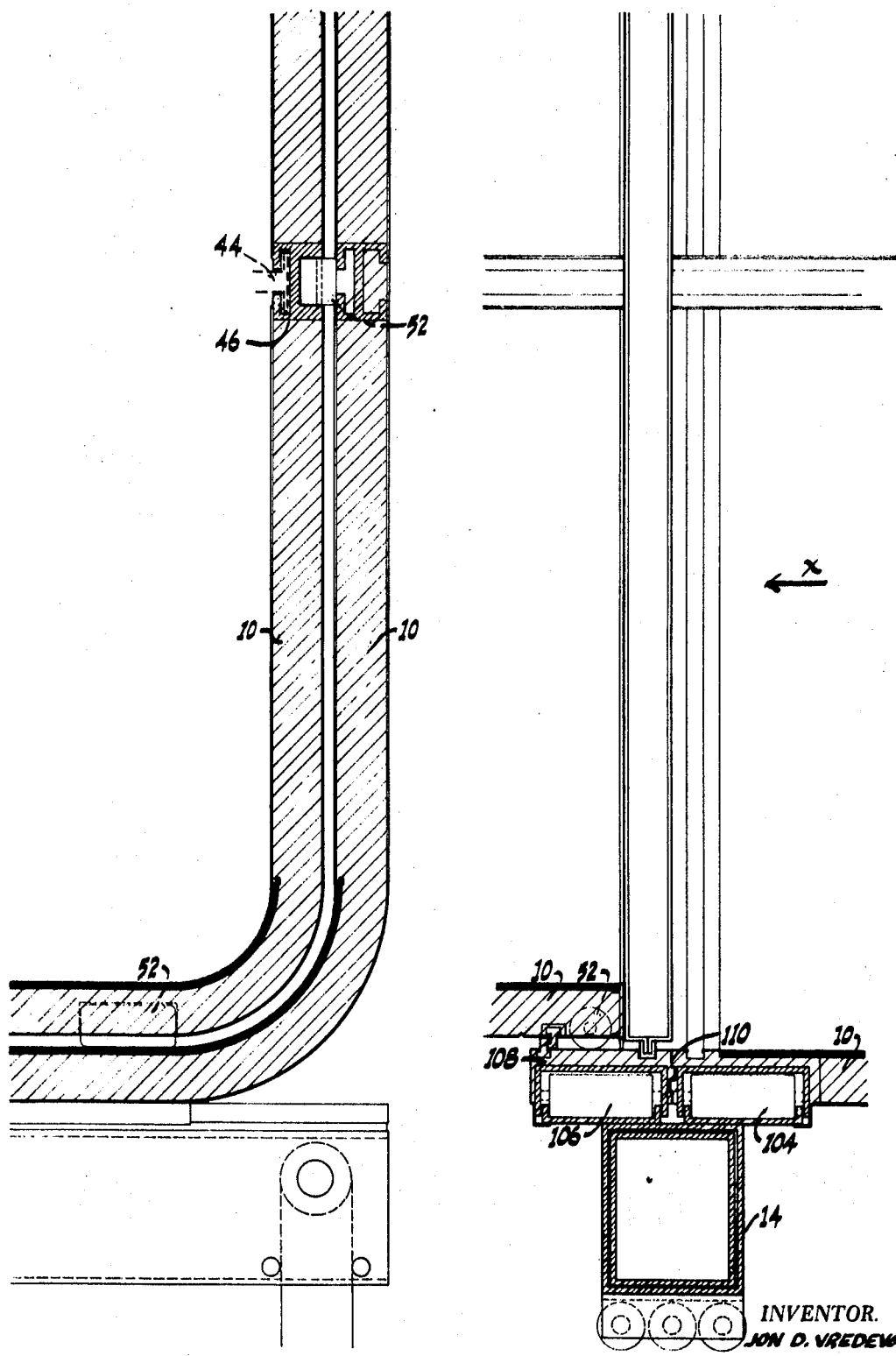
FIGS. 17a and 17b constitute a section through a telescoped portion of two units showing one of the continuous tracks and carpeting inserted in each of the units.
FIGS. 18a and 18b constitute a section taken through two adjacent modules showing the supporting means therefor in section.

FIGS. 8, 9 and 10 show a cabinet 40 which, by way of example, is shown with a tambour door 42. The cabinet is provided with pivoting locking bars 44 spaced in a manner to engage in the elongated tracks 46 and 48 as clearly shown in FIGS. 17a and 17b. The tracks 46 and 48 are located on both interior walls of each of the modules 10 and spaced from each other a certain distance so that cabinets or other furniture units may be hung on the tracks. In this regard it should be noted that the furniture or interior components of the mobile home system may be hung on both tracks 46 and 48, or either on the lower track 46 or the upper track 48, depending upon the location desired. The tracks 46 and 48 are designed so that the locking bars 44 may be inserted therein and the handle 45 turned to pivot the bars downward into locking engagement with the track as seen in FIG. 17a.

Figure 17B:
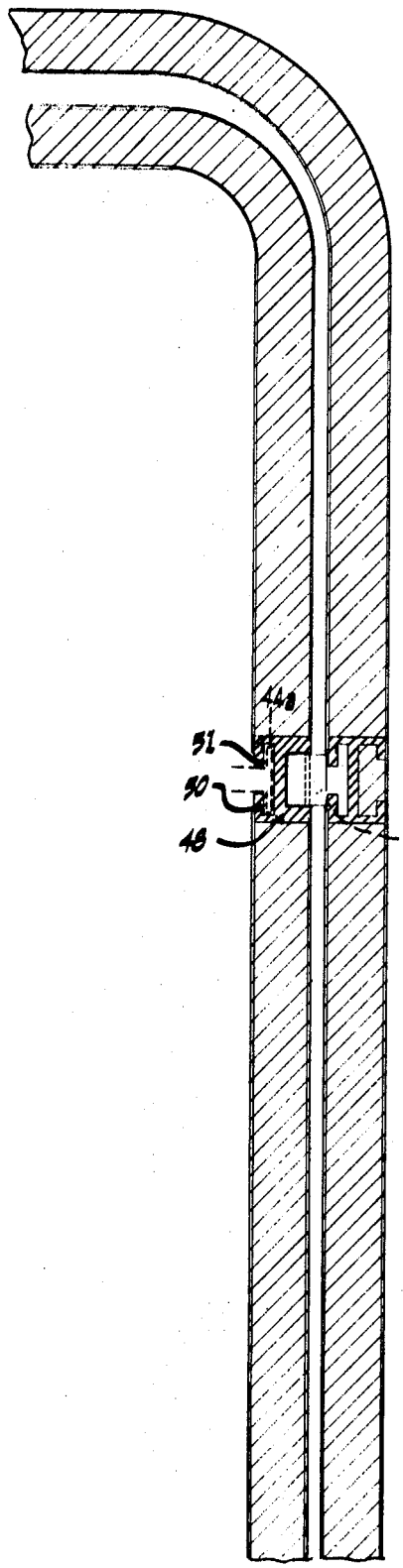

The tracks 46 and 48 are further provided with electrical strips 50 and 51 as seen in FIG. 17b, however no electrical connection is made unless the locking bar 44a is T-shaped, as seen in FIG. 17b. Naturally, only appliances that require a source of electric power would have a T-shaped locking bar 44a. The modules 10 slide within each other by means of rollers 52 particularly shown in FIGS. 17a, 17b and 18a.

FIGS. 8, 11, 14 and 15 disclose the detachable wheels or casters 54 having a U-shaped frame 56 mounted on the axle 58. A transverse plate 60 on support post 62 is adapted to be slid with a friction fit within the flat flanged retainer member 64. Thus, the cabinet 40 or any other component of the mobile home may have casters 54 removably inserted thereon and easily moved from location to location in the mobile home system. When the cabinet or other component is fixed in place the casters 54 may be removed, leaving only the retainer member 64, the latter being unobtrusive.

It will be noted that FIGS. 8–10, 12 and 13, 15 and 16 illustrate different types of cabinets that may be utilized as interior components of the present mobile home system.

When any of the modules 10 are shifted laterally as shown in FIGS. 3b and 5b, and as seen in the latter figure, open areas appear on the walls generally referred to by the numeral 11 which are transverse to the sides of the modules 10. These open areas may be filled with a window panel, a door panel or a blank panel. FIG. 19 discloses a window panel adapted for use in the present novel mobile home system which constitutes sealed transparent plates 68 and 70 having an enclosed space 72 therebetween. A sunshade which may take the form of a venetian blind 74 is operable in the enclosed space. The blind 74 may be controlled by a crank (not shown) or any other suitable device that is externally operated. The window unit is inserted in the pockets 76 and 78 of the frame of the module 10 and sealed therein by means of gaskets 80 and 82 respectively.

FIGS. 20 and 21 show a pivoting door insert unit 84 for the open areas 11. The door unit 84 is provided with a frame 86 and is also provided with a pivot 88 inserted in a socket 90 in the frame of the module 10. Therefore, a swinging door which is preferably centrally pivoted is utilized in the present mobile home system. FIGS. 22, 23 and 24 are views showing a sliding door unit that also may be used as an insert in the open areas 11 of the mobile home. As will be noted from FIG. 23, the sliding part 94 of the sliding door unit 92 slides in the directions of the double-ended arrow C. The sliding door unit 92, like the window panel of FIG. 19, is also shown in pockets 96 and 98 of the frame of the module 10 and sealed therein by means of gaskets 100 and 102. It should be apparent that one may selectively insert window units, door units or merely blank panels in the open areas 11 of the present unique mobile home system.

Figure 18B:
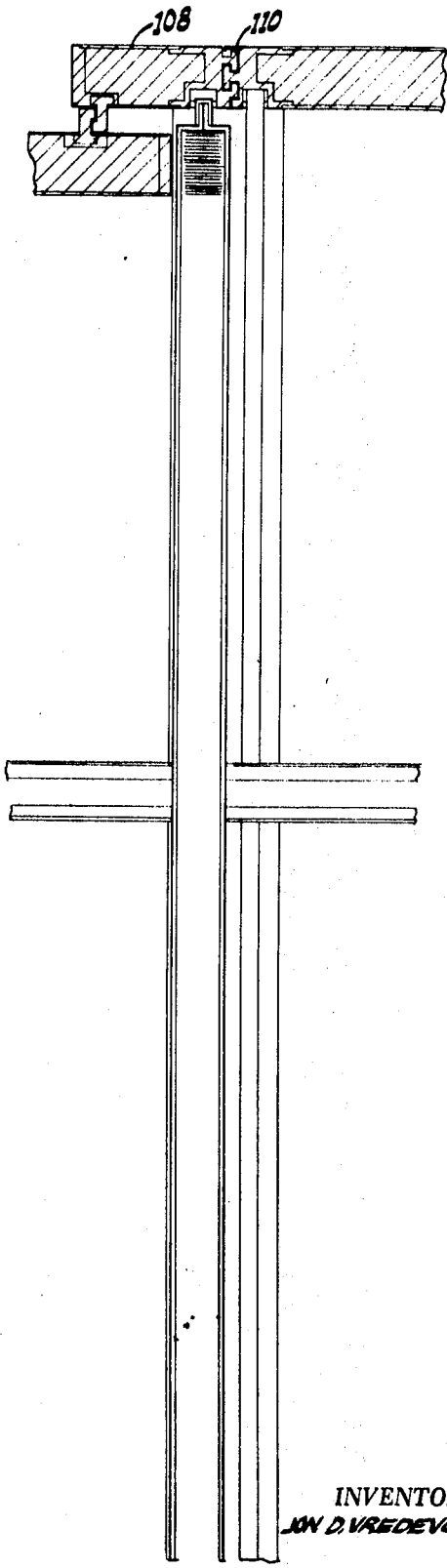

As referred to above, the modules 10 are telescoped within each other and adapted to be shifted radially with respect to each other. The structure to effect these movements are seen in FIGS. 5b, 18a and 18b. As seen in FIG. 18a, the left hand module 10 is an inside module while the right hand module 10 is the outside module. Therefore, movement in the direction of the arrow X contracts or telescopes the mobile home system. However, when the two adjacent modules 10 are pulled out from each other and extended as seen in FIG. 18a, either of the modules 10 may be shifted laterally on their respective rollers 104 or 106. Thus, the modules 10 may be moved laterally on the support base 14 by means of their respective rollers and the break point between the adjacent rollers 104 and 106 is indicated by the reference numeral 110. The gasket 108 is shown between the housing of roller 106 and module 10 on the bottom of the module and between adjacent modules 10 on the top of FIG. 18b. The break 110 also appears on the top of FIG. 18b in which the sliding of the tops of the adjacent modules is accomplished at this point.

What is claimed is:

1. A mobile home system comprising a plurality of permanently slidingly attached modules telescoped within each other and when in an expanded condition at least one of said modules being selectively moved laterally a distance to permit a continuous passage through said modules while maintaining the attachment of said modules.

2. A mobile home system comprising at least four permanently slidingly attached modules selectively axially extended and contracted in a telescoping manner and at least one of said modules being selectively slid laterally a distance to permit a continuous passage through said modules while maintaining the attachment of said modules, and a mounting track arrangement on an interior wall thereof for removably securing home components thereto.

3. A mobile home system as claimed in claim 1, wherein each of said modules are provided with sliding support means for movement of said modules within each other and laterally relative to each other.

4. A mobile home system as claimed in claim 1, further comprising support members movable rectilinearly laterally to permit the selective lateral shifting of the modules which rest thereon, said support members being provided with adjustable ground-engaging vertical stanchions.

5. A mobile home system as claimed in claim 1, wherein one of said modules which is slid laterally relative to the adjacent module forms an opening on the wall of said one module extending transverse to side surface thereof, and a window panel inserted in said opening.

6. A mobile home system as claimed in claim 5, wherein one of said modules which is slid laterally relative to the adjacent module forms an opening on the wall of said one module extending transverse to side surface thereof, and a door unit inserted in said opening.

7. A mobile home system as claimed in claim 5, wherein one of said modules which is slid laterally relative to the adjacent module forms an opening on the wall of said one module extending transverse to side surface thereof, and a filler panel inserted in said opening.

References Cited

UNITED STATES PATENTS

| | | | |
|---|---|---|---|
| 2,154,142 | 4/1939 | Whelan | 52—79 |
| 2,363,259 | 11/1944 | Penton | 52—79 |
| 2,732,251 | 1/1956 | Meaker | 52—67X |
| 3,089,042 | 5/1963 | Hickey et al. | 339—21X |
| 3,116,085 | 12/1963 | Uttley | 52—67X |
| 3,212,646 | 10/1965 | Propst | 52—36X |
| 3,324,620 | 6/1967 | Requena | 52—473X |
| 3,380,205 | 4/1968 | Ratchford | 52—126 |

PRICE C. FAW, JR., Primary Examiner

U.S. Cl. X.R.

52—64, 122, 234; 312—250; 339—21R